Aug. 24, 1965   J. M. KING   3,201,900

FLORISTS' ACCESSORY

Filed Dec. 16, 1963

James M. King,
Inventor.
Koenig, Pope, Senniger and Powers
Attorneys.

United States Patent Office 3,201,900
Patented Aug. 24, 1965

3,201,900
FLORISTS' ACCESSORY
James M. King, Los Angeles, Calif., assignor of forty percent to L. M. Sheridan, five percent to John N. Newland, five percent to P. L. MacDonald, and one and one-fourth percent to James A. Poore, all of Butte, Mont.
Filed Dec. 16, 1963, Ser. No. 330,771
5 Claims. (Cl. 47—41.12)

This invention relates to florists' accessories, and more particularly to an accessory for use by florists in making up floral arrangements such as so-called floral sprays or designs, the accessory being an improvement on the accessories described and claimed in my U.S. Patent No. 2,904,933, entitled Florists' Accessories, issued September 22, 1959.

Generally, this invention comprises a watertight container having a water absorbent filler material therein and having a construction which provides additional support for stems of flowers, foliages and the like and which decreases the possibility of leakage of water from the container.

Among the several objects of this invention may be noted the provision of an improved flower holder for holding cut flowers and/or decorative accessories, if desired, in ornamental arrangements which securely holds the flowers, and particularly laterally extending flowers, in desired positions, and also provides the means for supplying moisture to the flowers to keep them fresh; the provision of a flower holder of the class described which decreases the possibility of leakage through holes made in the holder by laterally extending flowers; the provision of a flower holder such as described which is extremely rigid and which securely holds the flowers in position even under rough handling; and the provision of a flower holder of the class described which is economical in construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of a flower holder of this invention;

Corresponding reference characters indicate corresponding parts throughout the several views of the drawings.

Figure 1:
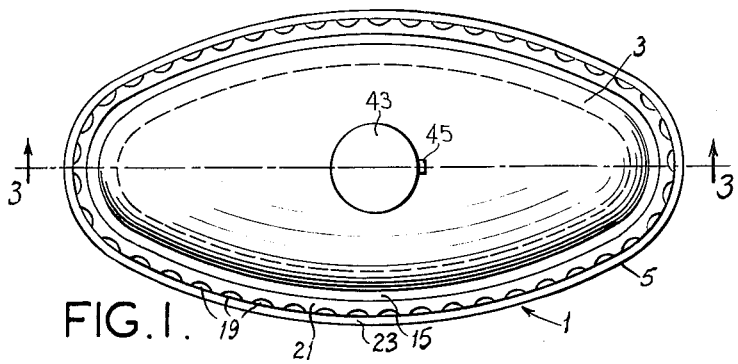
Figures 2, 6:
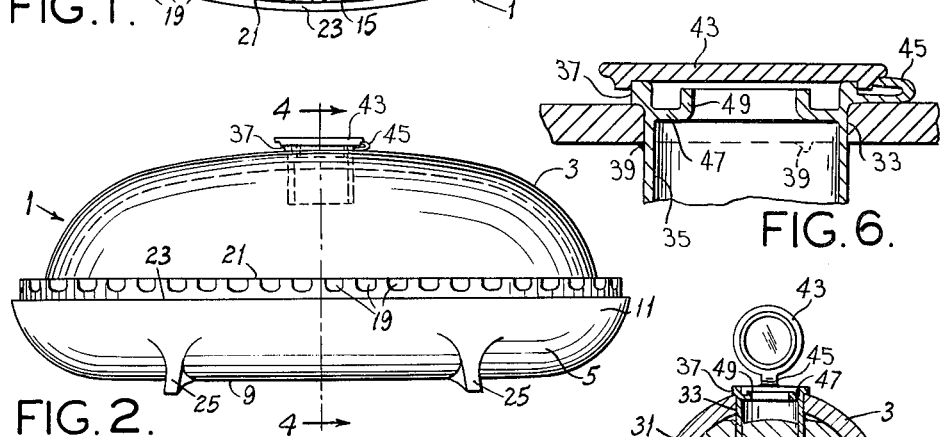
FIG. 2 is a side elevation of FIG. 1.
FIG. 6 is an enlarged fragmentary view of FIG. 3 showing the closure member in detail.
Figures 3, 4:
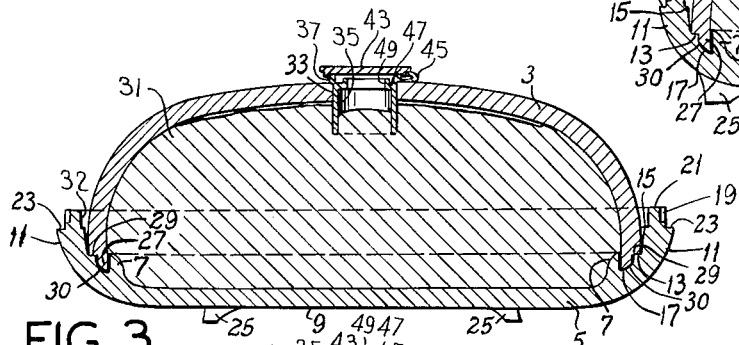
FIG. 3 is a longitudinal cross section taken on line 3—3 of FIG. 1.
FIG. 4 is a transverse cross section taken on line 4—4 of FIG. 2, showing a closure member in an open position.

Floral arragements or decorations are often made with a plurality of flowers and/or decorative accessories such as leaves and other foliage extending at various angles, including laterally, from a base holding a centrally located group of flowers so as to provide a border or background for the centrally located flowers. These laterally extending flowers or accessories form part of the complete decoration and enhance the attractiveness of the floral decoration or spray, thus creating a so-called stylized arrangement as opposed by definition to an ordinary bouquet arrangement in which flowers are arranged with relatively few, if any, laterally extending flowers. Heretofore, it has been difficult to connect the laterally extending flowers to the base in such a manner as to prevent them from becoming easily dislodged during handling and delivery. While the laterally extending pieces could be connected by binding with string or wire, such a connection took a considerable amount of time and skill to make. Even then the binding might come loose unless the decoration was handled with extreme care. Such care is not always exercised by those employees unfamiliar with the skills of flower arranging. Although bound or tied connections tend to reduce disarrangement of laterally extending flowers in dry plastic foam bases and the like, they have proved much less effective with water-holding bases. It was possible, by overloading a water-holding base with too many flower stems or by incorrectly watering the flowers, to raise the level of water in the base above the level of the laterally extending flowers, thus causing leakage. This would be likely to occur when a person unskilled in floral arranging would be watering or constructing a floral arrangement.

According to the present invention, the above-mentioned difficulties with prior flower holders are eliminated and a person unskilled in the art of floral arranging can design and produce a floral arrangement which is stable, i.e., it will not come apart and even the laterally extending flowers will not be dislodged under rough handling, and which is not likely to leak even if incorerctly or improperly watered, or if too many flowers are placed in the floral arrangement. Furthermore, this flower holder, while being constructed of lightweight material, is extremely strong and rigid. It will withstand substantial physical shock, such as might occur during shipment of the completed floral arrangement, without being damaged.

Referring to the drawings, a flower holder of my invention is shown to comprise a container 1 having a dome-shaped body or upper member 3 and a base or lower member 5. Body 3 and base 5 are made of relatively thin molded sections of a rigid multicellular, closed-cell material having frangible cell walls. The density of the material forming body 3 is such that it is capable of being easily pierced by the stems of cut flowers and the like. The multicellular material may be of the type described in my above-mentioned Patent 2,904,933, i.e., the material may be an aerated, lightweight closed-cell frangible polystyrene plastic such as sold under the trade names of "Styrofoam," "Floralfoam," "Dylite," "Pelaspan" or "Unicrest."

The dome and base in longitudinal cross section are generally elliptical and base 5 is generally bowl- or shell-shaped. Base 5 has a generally elliptical and continuous ridge or flange 7 extending upwardly from the bottom 9 of the base. The wall portion 11 of the base is formed to provide two shoulders 13 and 15 extending around the inside thereof. The shoulder 13 and ridge 7 are spaced apart to provide a groove 17 therebetween.

Wall portion 11 is provided with a series of indentations 19 around the outside of the rim 21 and a shoulder 23 immediately below the indentations 19. The shoulders 13, 15 and 23, and the ridge 7 obviously increase the rigidity of the base against forces applied to the base in a direction generally parallel to the shoulders. However, certain of these shoulders, and the ridge 7, also perform other functions as will be made apparent hereinafter.

Base 5 is preferably formed to provide feet 25 so that, when the holder is placed on a table or the like, air may pass beneath the holder to obviate condensation. The feet also increase the rigidity of the base.

The lower edge of dome 3 is provided with a generally elliptical and continuous tongue 27 and shoulder 29. The tongue 27 mates with the groove 17 and shoulder 29 is seated on shoulder 13. Wax, glue or other suitable sealing material 30 is located between ridge 7 and tongue 27 and between the remainder of groove 17 and the tongue to bond the parts together and make the joint substantially watertight. It will be seen that ridge 7, in addition to rigidifying the base 5, has two other functions, to wit, it abuts the tongue 27 to keep the latter in groove 17 and it provides a surface on which glue is placed to join the dome to the base. Shoulder 13, in addition to rigidifying the base, also provides a seat for shoulder 29. Thus, it has a double function. The upper portion of wall 11, including rim 21, is located outwardly from the outside of the dome wall to provide a space 32, the purpose of which will be made apparent hereinafter.

Within the multicellular rigid container 1, I provide a granular, water-absorbent filler material 31 which is easily pierced by flower stems and yet is capable of providing adequate supplementary support for the flowers pierced through the dome and into it. The filler material 31 is preferably any of the various inert fillers described in my aforementioned U.S. patent, such as perlite, for example. Perlite, as noted in said patent, is of mineral origin. When crushed and then heated, each particle is expanded into twenty times its original size. These particles consist principally of sealed void cells, microscopic in size. Perlite has a total porosity of approximately 96%. The interconnected porosity of perlite, i.e., the volume of water retained divided by the volume of perlite, is up to 67% before inserting flower stems. When stems are inserted into the wetted perlite, the cells surrounding the stems are fragmented to some extent, thereby opening some of the sealed voids. This permits the entry of water and, in effect creates new areas of interconnected porosity. Perlite rapidly absorbs and absorbs water poured into it, yet it has the characteristics of gradually releasing a great percentage of its suspended water to flowers in response to their transpiration process. Even when holding a substantial volume of water, perlite filler feels almost dry. Thus, the filler is adapted to rapidly absorb and hold water, containing a nutrient for flowers if desired, but it does not leak or drain even when being penetrated by the stems of flowers pierced through the dome.

Figure 5:
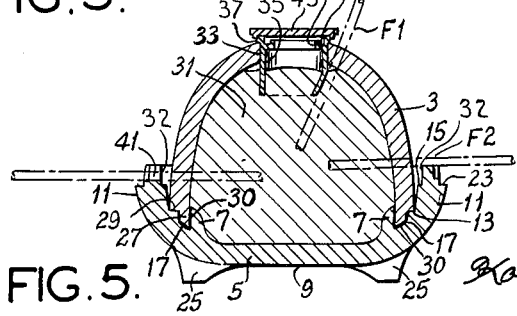
FIG. 5 is a view similar to FIG. 4 showing the closure member in a closed position and illustrating three flower stems inserted in the holder.

Filler 31 may be packed in the container prior to adhering the dome to the base; or alternatively it may be fed through a hole 33 in the top of the dome by any of several mechanical means. A flexible tube 35, preferably made of polyethylene, is pressed into hole 33 prior to filling the container with material 31. An annular shoulder 37 and three annular spaced projections 39 are provided on tube 35 for seating the latter in hole 33. The flexible tube 35 which extends downwardly from hole 33, will yield to one side or the other when the stems of flowers pierced through the dome engage or contact it. Thus the flexible tube does not prevent or hinder the placement of flowers adjacent the hole 33 such as indicated at F1 in FIG. 5.

A cap or plug 43 for closing the hole 33 and preventing outflow of filler 31 during manufacturing and shipping is preferably connected to the upper end of the tube by a so-called living hinge or strap 45. The cap 43 may carry a card printed with instructions on the method of use of the flower holder or instructions as to the amount of water to be used, etc. Strap 45 prevents the loss of the cap 43 and may be grasped to pull the tube 35 out of the hole when the tube is no longer needed. Tube 35 is provided with an internal shelf 47 having an upstanding lip 49 adapted to receive the mouth of a bottle, such as a soft-drink bottle, for example, for filling the container with water.

It is contemplated that the dome 3 may be made of Styrofoam or urethane foam of a density of approximately 1.25 pounds per cubic foot. The base 5 may be made of a denser Styrofoam having a density of 2.75 pounds per cubic foot, for example, to prevent flowers which have been pierced through the dome and into the filler 31 from going into the air again through the bottom.

To suitably moisten the filler, the cap 43 is removed and water is poured into the tube, preferably by standing a bottle of water upside-down with the mouth of the latter seated on shelf 47. Natural forces between the water descending from the bottle and air rising into it from the filler regulate the flow and distribution of water. This automatic filling provision is particularly advantageous in that it permits simultaneous filling of several holders by using several bottles of water. If the holder is incorrectly watered, as by spilling for example, the water is caught and held in space 32 around the holder. However, tube 35 prevents excess moistening of the filler with water because the water entraps air in the space around and above the bottom of the tube. After watering, the cap 37 may be replaced, particularly if the user wants to store the container out of the way but ready for use. This may be done several days in advance to special occasions or holidays when watering procedures would interfere with production and take space which is usually at a premium.

Flower stems may be pushed through any dome area and into the filler. The stems pushed generally downward into the dome and filler are prevented from pivoting by the two point contact with the dome and the filler. As more and more stems are inserted into the filler 31, the latter tightens the grip on the stems already in place. The laterally extending flowers may be pushed through the dome and into the filler and rest on the rim 21 of the base 5, such as illustrated at F2. Such stems are supported by three elements, namely the filler 31, the dome 3 and the rim 21, and thus are securely maintained in position.

Long or heavy laterally extending flowers, when transported in the floral arrangements, have definite tendencies to wobble and become progressively less firmly connected with the bedding materials surrounding their stems. This frequently results in a cutback of water intake by the inserted ends of the stems where moisture is drawn, thus causing dehydration and wilting, stem rotation and general disarrangement of the flowers. It can be seen that the cumulative effects of slight movements of several individual laterally extending heavy or long flowers from their designed positions can cause disappointment among customers. Thus retention of the precise alignment and positioning of such flowers is essential to aesthetic arrangements. According to the present invention, these laterally extending flowers may be retained in precise alignment and position by notching as indicated at 41 to cradle the stems and provide a further steadying effect, particularly against movement in a sidewise direction, i.e. in a direction lateral and generally perpendicular to the stems. It is also possible and sometimes desirable to punch a hole through the wall portion 11 adjacent rim 21 with a stick or other rigid elongate member, rather than notching the rim. A hole through the wall portion would, in addition to the support provided by a notch, provide additional support against upward movement of the stem of a flower inserted in the container through the hole. In any event, the rim 21, dome 3 and filler 31 provide three supports for the laterally extending flowers. Moreover, the laterally extending stems are a considerable distance above the bottom of the base 5 so that a substantial amount of excess water could be collected in the bottom of the base without leakage through the holes made in the dome by the laterally extending flowers. Furthermore, if the water level inside the container were above the level of the laterally extending flowers and some leakage of water through the holes made by the flowers did occur, such water would be caught in the space 32 between the outside of the dome and the inside of the wall portion 11. This space 32 thus forms a trough which prevents overflow of water onto the furniture or other structure supporting the flower holder. This water can either be dumped out at a convenient time and place, or a few downwardly slanting holes could be made through the lowest portion of the dome to enable the filler 31 to gradually adsorb the water as the flowers draw water from the filler. The space 32 may also serve as a reservoir or even a convenient place for periodic replenishment of water consumed by flowers, especially after delivery. Rewatering after stems have been inserted may be accomplished by removing two or three flowers from the top of the dome near hole 33 and pouring water into each hole until some of the filler floats up into the opening and recedes again two or three times. The flowers may then be replaced. Rewatering tightens the contact between the filler and the cambium layers of the flower stems exposed at the cut ends of the latter.

It will be seen that the flower holder of the present invention may be used by even the most inexperienced floral arranger without difficulty. No wires or binding materials are needed, thus decreasing the amount of time necessary to prepare a floral spray or decoration.

The particular elliptical construction of the bowl-shaped base not only insures a rigid holder, but catches and holds excess water and provides additional support for laterally extending flowers or accessories. However, it will be understood that other shapes may be utilized without departing from the spirit of this invention.

While the cap 43 is shown as being adapted to fit on the outside periphery of the upper portion of annular shoulder 37, it will be understood that the cap could be constructed so as to fit the inner periphery of the upper end of tube 35, or the inner or outer periphery of upstanding lip 49. It will also be seen that cap 43 may be provided with a handle, if desired, in any convenient location thereon.

The term "flowers" as used herein is meant to include decorative accessories such as leaves and other foliage, for example, as well as blooming specimens.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A flower holder comprising an upper member open at its bottom and a lower member open at its top, said members being adhered together to provide a substantially watertight container, the upper member being made of a substantially rigid multicellular closed-cell material having frangible cell walls capable of being pierced by the stems of cut flowers and adapted to support the flowers in a desired arrangement, a filler in the container adapted to hold water for supplying moisture to the stems of flowers pierced through the multicellular material and capable of being penetrated by the stems of flowers pierced through the multicellular material to form a bed for additionally supporting the flowers, the upper edge of said lower member being located above the lower edge of said upper member for additionally supporting the stems of flowers pierced through said material into said filler and extending in a generally horizontal direction, and said lower member having at least one shoulder extending around it to rigidify the lower member against forces applied to it in a direction generally parallel to said shoulder.

2. A flower holder comprising an upper member open at its bottom and a lower member open at its top, said members being adhered together to provide a substantially watertight container, the upper member being made of a substantially rigid multicellular closed-cell material having frangible cell walls capable of being pierced by the stems of cut flowers and adapted to support the flowers in a desired arrangement, a filler in the container adapted to hold water for supplying moisture to the stems of flowers pierced through the multicellular material and capable of being penetrated by the stems of flowers pierced through the multicellular material to form a bed for additionally supporting the flowers, the upper edge of said lower member being located above the lower edge of said upper member for additionally supporting the stems of flowers pierced through said material into said filler and extending in a generally horizontal direction, said lower member having at least one shoulder extending around it to rigidify the lower member against forces applied to it in a direction generally parallel to said shoulder, and said lower member being made of material substantially impenetrable by the stems of flowers, and the upper edge of said lower member being adapted to be notched to cradle the stems of the horizontally extending flowers.

3. A flower holder comprising a container having a dome-shaped body and a bowl-shaped base, the inside of said base and the lower edge of said body being formed for mating with one another, adhesive between the mating portions of said body and base securing them together, the body being made of a substantially rigid multicellular closed-cell material having frangible cell walls capable of being pierced by the stems of cut flowers and adapted to support the flowers in a desired arrangement, a filler in the container adapted to hold water for supplying moisture to the stems of flowers pierced through the multicellular material and capable of being penetrated by the stems of flowers pierced through the multicellular material to form a bed for additionally supporting the flowers, the rim of said bowl-shaped base being located above the lower edge of said body for supporting the stems of flowers pierced through said body into said filler and extending in a generally horizontal direction, and said base having at least one shoulder extending around it to rigidify the base against forces applied to it in a direction generally parallel to said shoulder.

4. A flower holder comprising a container having a dome-shaped body and a bowl-shaped base, the inside of said base and the lower edge of said body being formed for mating with one another, adhesive between the mating portions of said body and base for securing them together, the body being made of a substantially rigid multicellular closed-cell material having frangible cell walls capable of being pierced by the stems of cut flowers and adapted to support the flowers in a desired arrangement, a filler in the container adapted to hold water for supplying moisture to the stems of flowers pierced through the multicellular material and capable of being penetrated by the stems of flowers pierced through the multicellular material to form a bed for additionally supporting the flowers, the rim of said bowl-shaped base being located above the lower edge of said body for supporting the stems of flowers pierced through said body into said filler and extending in a generally horizontal direction, and said base having a plurality of shoulders extending around it to rigidify the base against forces applied to it in a direction generally parallel to said shoulders.

5. A flower holder comprising a container having a dome-shaped body and a bowl-shaped base, the inside of said base and the lower edge of said body being formed for mating with one another, adhesive between the mating portions of said body and base for securing them together, the body being made of a substantially rigid multicellular closed-cell material having frangible cell walls capable of being pierced by the stems of cut flowers and adapted to support the flowers in a desired arrangement, a filler in the container adapted to hold water for supplying moisture to the stems of flowers pierced through the multicellular material and capable of being penetrated by the stems of flowers pierced through the multicellular material to form a bed for additionally supporting the flowers, the rim of said bowl-shaped base being located above the lower edge of said body for supporting the stems of flowers pierced through said body into said filler and extending in a generally horizontal direction, said base having at least one shoulder extending around it to rigidify the base against forces applied to it in a direction generally parallel to said shoulder, said base being made of material substantially impenetrable by the stems of flowers, and the rim of said base being adapted to be notched to cradle the stems of the laterally extending flowers.

References Cited by the Examiner

UNITED STATES PATENTS

| | | | |
|---|---|---|---|
| 2,765,585 | 10/56 | Smithers | 47—41.4 |
| 2,891,354 | 6/59 | Smithers | 47—41.4 |
| 2,904,933 | 9/59 | King | 47—41.4 |
| 2,950,567 | 8/60 | Newman | 47—34.1 |

T. GRAHAM CRAVER, *Primary Examiner.*